(12) United States Patent
Shah et al.

(10) Patent No.: US 12,309,505 B2
(45) Date of Patent: *May 20, 2025

(54) CALIBRATION FOR HEAD-MOUNTABLE DEVICES

(71) Applicant: Apple Inc., Cupertino, CA (US)

(72) Inventors: Ritu Shah, Sunnyvale, CA (US); Forrest C. Wang, Petaluma, CA (US)

(73) Assignee: Apple Inc., Cupertino, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 18/213,780

(22) Filed: Jun. 23, 2023

(65) Prior Publication Data

US 2023/0336708 A1 Oct. 19, 2023

Related U.S. Application Data

(63) Continuation of application No. 17/402,392, filed on Aug. 13, 2021, now Pat. No. 11,729,373.

(60) Provisional application No. 63/078,810, filed on Sep. 15, 2020.

(51) Int. Cl.
| | |
|---|---|
| *H04N 23/90* | (2023.01) |
| *H02J 7/00* | (2006.01) |
| *H04N 5/38* | (2006.01) |
| *H04N 17/00* | (2006.01) |
| *H04N 23/695* | (2023.01) |
| *H04R 1/02* | (2006.01) |

(52) U.S. Cl.
CPC ............... *H04N 23/90* (2023.01); *H04N 5/38* (2013.01); *H04N 17/004* (2013.01); *H04N 23/695* (2023.01); *H04R 1/028* (2013.01); *H02J 7/0042* (2013.01); *H04R 2499/15* (2013.01)

(58) Field of Classification Search
CPC ...... H04N 17/004; H04N 5/38; H04N 23/695; H04N 23/80; H04N 17/002; H04N 23/90; H04R 1/028; H04R 2499/15; H02J 7/0042; H04S 7/304

See application file for complete search history.

(56) References Cited

U.S. PATENT DOCUMENTS

| | | | |
|---|---|---|---|
| 9,459,457 | B2 | 10/2016 | Murray et al. |
| 10,046,229 | B2 | 8/2018 | Tran et al. |
| 10,937,129 | B1* | 3/2021 | Fix .................. G06V 40/19 |
| 10,992,928 | B1 | 4/2021 | Rehder |
| 11,086,148 | B2 | 8/2021 | Chumbley et al. |
| 2005/0036038 | A1 | 2/2005 | Wu |
| 2014/0225916 | A1 | 8/2014 | Theimer |
| 2017/0337737 | A1 | 11/2017 | Edwards |

(Continued)

*Primary Examiner* — Michael E Teitelbaum
(74) *Attorney, Agent, or Firm* — BAKERHOSTETLER

(57) ABSTRACT

A head-mountable device can include display elements and/or cameras that can be calibrated for accurate recording and visual output. Whereas some aspects of a head-mountable device can be calibrated at the time of production, usage and wear of the head-mountable device can result in certain components becoming misaligned. A case or other reference can be used to calibrate the cameras of the head-mountable device to ensure that the captured images are recorded in a target alignment. The case can be operated with the head-mountable device to calibrate the display elements of the head-mountable device to ensure that the images are output in a target alignment. Such calibration can include consideration of any lenses installed in front of the display elements.

18 Claims, 6 Drawing Sheets

(56) References Cited

U.S. PATENT DOCUMENTS

| | | | |
|---|---|---|---|
| 2020/0209628 A1* | 7/2020 | Sztuk | G02B 27/0176 |
| 2021/0217147 A1* | 7/2021 | Edwin | G02B 27/0172 |
| 2022/0197033 A1 | 6/2022 | Liang | |

* cited by examiner

CALIBRATION FOR HEAD-MOUNTABLE DEVICES

CROSS-REFERENCE TO RELATED APPLICATION

This application is a continuation of U.S. patent application Ser. No. 17/402,392 entitled "CALIBRATION FOR HEAD-MOUNTABLE DEVICES," filed on Aug. 13, 2021, which claims the benefit of U.S. Provisional Application No. 63/078,810, entitled "CALIBRATION FOR HEAD-MOUNTABLE DEVICES," filed Sep. 15, 2020, the entirety of each of which is incorporated herein by reference.

TECHNICAL FIELD

The present description relates generally to head-mountable devices, and, more particularly, to calibration for head-mountable devices.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
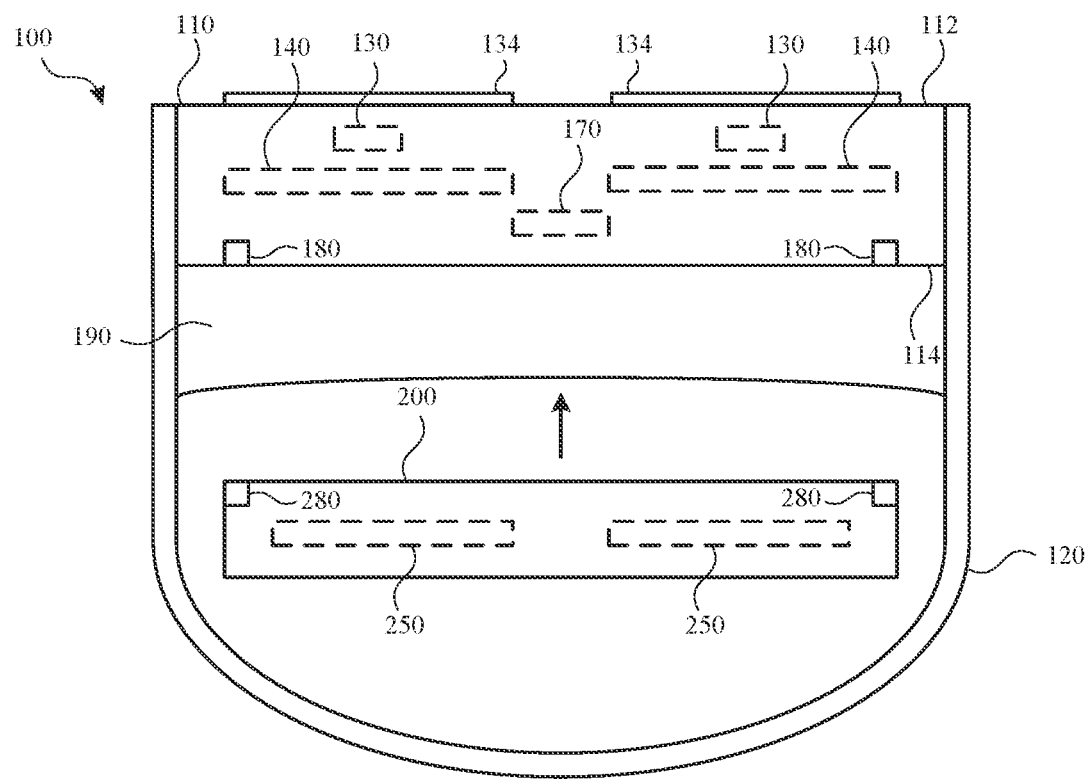
FIG. 1 illustrates a top view of a head-mountable device, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device. The head-mountable device can provide a user experience that is immersive or otherwise natural so the user can easily focus on enjoying the experience without being distracted by the mechanisms of the head-mountable device.

Components of a head-mountable device can include one or more cameras that capture images and/or optical modules that provide images as views (e.g., to an external environment). Such optical modules can include a display element and/or optical elements that enhance a user's view. The display element can be oriented in a direction that optimally provides a view along an optical pathway between the display element and the eye of the user. For example, the display element can emit light along the optical pathway to arrive at the user's eye.

During use and across the lifespan of the head-mountable device, the optical components, including the cameras and/or display element, can become misaligned. For example, the support structure supporting a camera and/or a display element can be altered due to shock (e.g., drop event, impact, etc.), degradation, erosion, friction, wear, and/or aging of components. High-resolution cameras and displays in head-mountable devices are sensitive to misalignment. Angular or positional shifts can cause user discomfort due to monocular focus gradients, binocular focus differences, degradation in image sharpness, and reductions or shifts in the field of view (FOV). While the head-mountable device can be aligned during assembly, it can be beneficial to maintain and/or correct the alignment of a camera and/or a display element with respect to the eyes of the user. Additionally, certain components can be provided after manufacture, such as lenses that are selected to accommodate a particular user. Initial and ongoing calibration for such lenses can be performed on an ongoing basis.

These and other embodiments are discussed below with reference to FIGS. 1-10. However, those skilled in the art will readily appreciate that the detailed description given herein with respect to these Figures is for explanatory purposes only and should not be construed as limiting.

According to some embodiments, for example as shown in FIG. 1, a head-mountable device 100 can include a housing 110 that is worn on a head of a user. The housing 110 can be positioned in front of the eyes of a user to provide information within a field of view of the user. A light seal 190 can be on a side of the housing 110 that faces the user to comfortably engage the face of the user and block light from an external environment.

The housing 110 can be supported on a user's head with the securement element 120. The securement element 120 can wrap or extend along opposing sides of a user's head. The securement element 120 can optionally include earpieces for wrapping around or otherwise engaging or resting on a user's ears. It will be appreciated that other configurations can be applied for securing the head-mountable device 100 to a user's head. For example, one or more bands, straps, belts, caps, hats, or other components can be used in addition to or in place of the illustrated components of the head-mountable device 100. By further example, the securement element 120 can include multiple components to engage a user's head. The securement element 120 can extend from the housing 110 and/or the light seal 190. The housing 110 and/or the light seal 190 can provide nose pads or another feature to rest on a user's nose.

While the light seal 190 is shown schematically with a particular size and shape, it will be understood that the size and shape of the light seal 190, particularly at the inner side of the light seal 190, can have a size and shape that accommodates the face of a user wearing the head-mountable device 100. For example, the inner side can provide a shape that generally matches the contours of the user's face around the eyes of the user. The inner side can be provided with one or more features that allow the light seal 190 to conform to the face of the user to enhance comfort and block light from entering the light seal 190 at the point of contact with the face. For example, the inner side can provide a flexible, soft, elastic, and/or compliant structure.

While the head-mountable device 100 is worn by a user, a light seal 190 can be placed against the face and/or head of the user. The light seal 190 can include a chassis that provides structural support to one or more other components of the light seal 190. The light seal 190 can define an interior space through which light can pass, thereby providing to the user wearing the head-mountable device a view of a display element of the display elements 140. Such a view can be enhanced by preventing the ingress of light from the external environment and into the light seal 190.

The housing 110 can provide structure around a peripheral region thereof to support any internal components of the housing 110 in their assembled position. For example, the housing 110 can enclose and support various internal components (including for example integrated circuit chips, processors, memory devices and other circuitry) to provide computing and functional operations for the head-mountable device 100, as discussed further herein. While several components are shown within the housing 110, it will be understood that some or all of these components can be located anywhere within or on the head-mountable device 100. For example, one or more of these components can be positioned within the securement element 120 and/or the light seal 190 of the head-mountable device 100.

The housing 110 can include and/or support one or more cameras 130. The cameras 130 can be positioned on or near an outer side 112 of the housing 110 to capture images of views external to the head-mountable device 100. As used herein, an outer side of a portion of a head-mountable device is a side that faces away from the user and/or towards an external environment. The captured images can be used for display to the user or stored for any other purpose. The cameras 130 can be provided a view through one or more windows 134 that transmit light there through. Each of the cameras 130 can be movable along the outer side 112. For example, a track or other guide can be provided for facilitating movement of the camera 130 therein.

The head-mountable device 100 can include display elements 140 that provide visual output for viewing by a user wearing the head-mountable device 100. One or more display elements 140 can be positioned on or near an inner side 114 of the housing 110. As used herein, an inner side 114 of a portion of a head-mountable device is a side that faces toward the user and/or away from the external environment.

A display element 140 can transmit light from a physical environment (e.g., as captured by a camera) and/or views captured by the cameras 130 for viewing by the user. Such a display element 140 can include optical properties, such as lenses for vision correction based on incoming light from the cameras and/or the physical environment. Additionally or alternatively, a display element 140 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Each display element 140 can be adjusted to align with a corresponding eye of the user. For example, each display element 140 can be moved along one or more axes until a center of each display element 140 is aligned with a center of the corresponding eye. Accordingly, the distance between the display elements 140 can be set based on an interpupillary distance of the user. IPD is defined as the distance between the centers of the pupils of a user's eyes.

The pair of display elements 140 can be mounted to the housing 110 and separated by a distance. The distance between the pair of display elements 140 can be designed to correspond to the IPD of a user. The distance can be adjustable to account for different IPDs of different users that may wear the head-mountable device 100. For example, either or both of the display elements 140 may be movably mounted to the housing 110 to permit the display elements 140 to move or translate laterally to make the distance larger or smaller. Any type of manual or automatic mechanism may be used to permit the distance between the display elements 140 to be an adjustable distance. For example, the display elements 140 can be mounted to the housing 110 via slidable tracks or guides that permit manual or electronically actuated movement of one or more of the display elements 140 to adjust the distance there between.

Additionally or alternatively, the display elements 140 can be moved to a target location based on a desired visual effect that corresponds to user's perception of the display element 140 when it is positioned at the target location. The target location can be determined based on a focal length of the user and/or optical elements of the system. For example, the user's eye and/or optical elements of the system can determine how the visual output of the display element 140 will be perceived by the user. The distance between the display element 140 and the user's eye and/or the distance between the display element 140 and one or more optical elements can be altered to place the display element 140 at, within, or outside of a corresponding focal distance. Such adjustments can be useful to accommodate a particular user's eye, corrective lenses, and/or a desired optical effect.

The head-mountable device 100 can include a sensor 170. The sensor 170 can be positioned and arranged to detect a characteristic of the user, such as facial features. For example, such a user sensor can perform facial feature detection, facial movement detection, facial recognition, eye tracking, pupil measurements, user mood detection, user emotion detection, voice detection, and the like.

Figure 2:
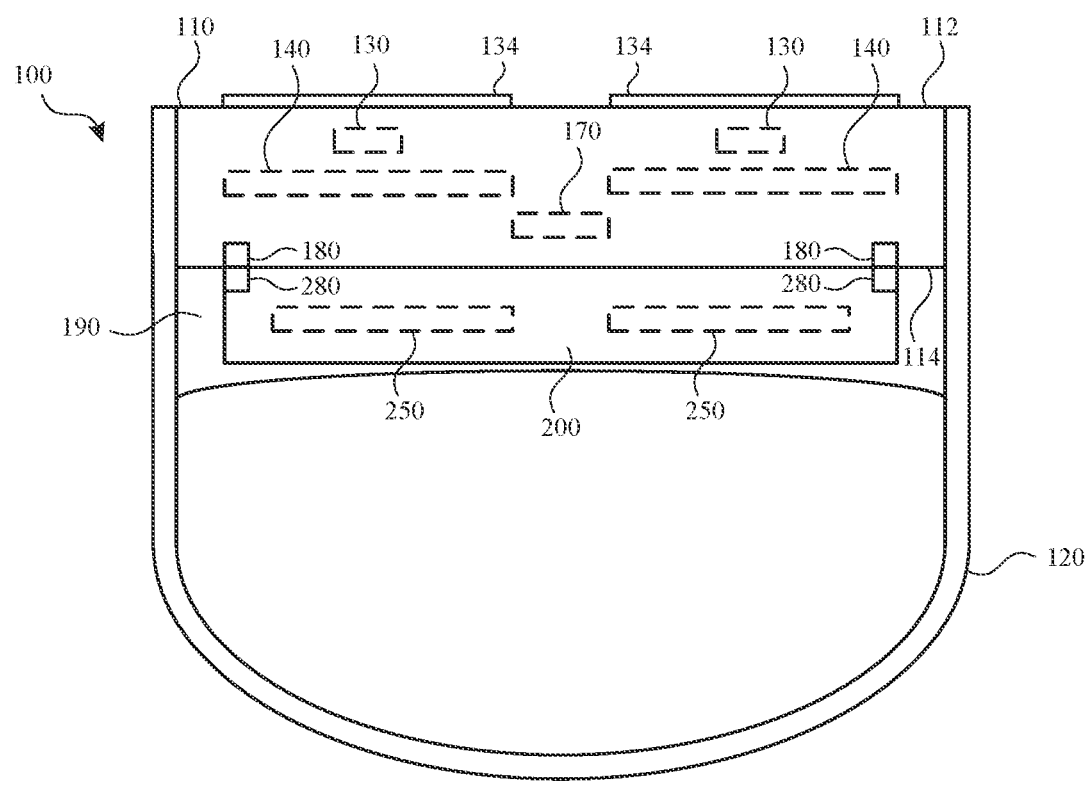
FIG. 2 illustrates a top view of the head-mountable device of FIG. 1 with the lens set installed, according to some embodiments of the present disclosure.

As further shown in FIGS. 1 and 2, a sample lens set 200 can be provided separate from and/or combinable with the head-mountable device 100. The sample lens set 200 can be or include one or more lenses 250 for providing corrective vision capabilities. It will be understood that, where multiple lenses are used, the lenses 250 of the sample lens set 200 can be provided together or separately (e.g., for combination).

As shown in FIGS. 1 and 2, attachment elements can facilitate coupling of the sample lens set 200 to the head-mountable device 100 in a relative position and orientation that aligns the lenses 250 of the sample lens set 200 in a preferred position and orientation relative to the display elements 140 of the head-mountable device 100 for viewing by the user. The head-mountable device 100 and the sample lens set 200 can be securely and releasably coupled together. For example, HMD attachment elements 180 can releasably engage lens attachment elements 280. One or more of various mechanisms can be provided to secure the components to each other. For example, mechanisms such as locks, latches, snaps, slides, channels, screws, clasps, threads, magnets, pins, an interference (e.g., friction) fit, knurl presses, bayoneting, fused materials, weaves, knits, braids, and/or combinations thereof can be included to couple and/or secure the head-mountable device 100 and the sample lens set 200 together. The components can remain secured to each other until an optional release mechanism is actuated. The release mechanism can be provided for access by a user.

As further shown in FIG. 2, the sample lens set 200 can optionally be coupled to the housing 110 while positioned within or near the light seal 190. It will be understood that the attachment elements can allow the sample lens set 200 to be securely held in any location that places the lenses 250 within a field of view of the user.

Figure 3:
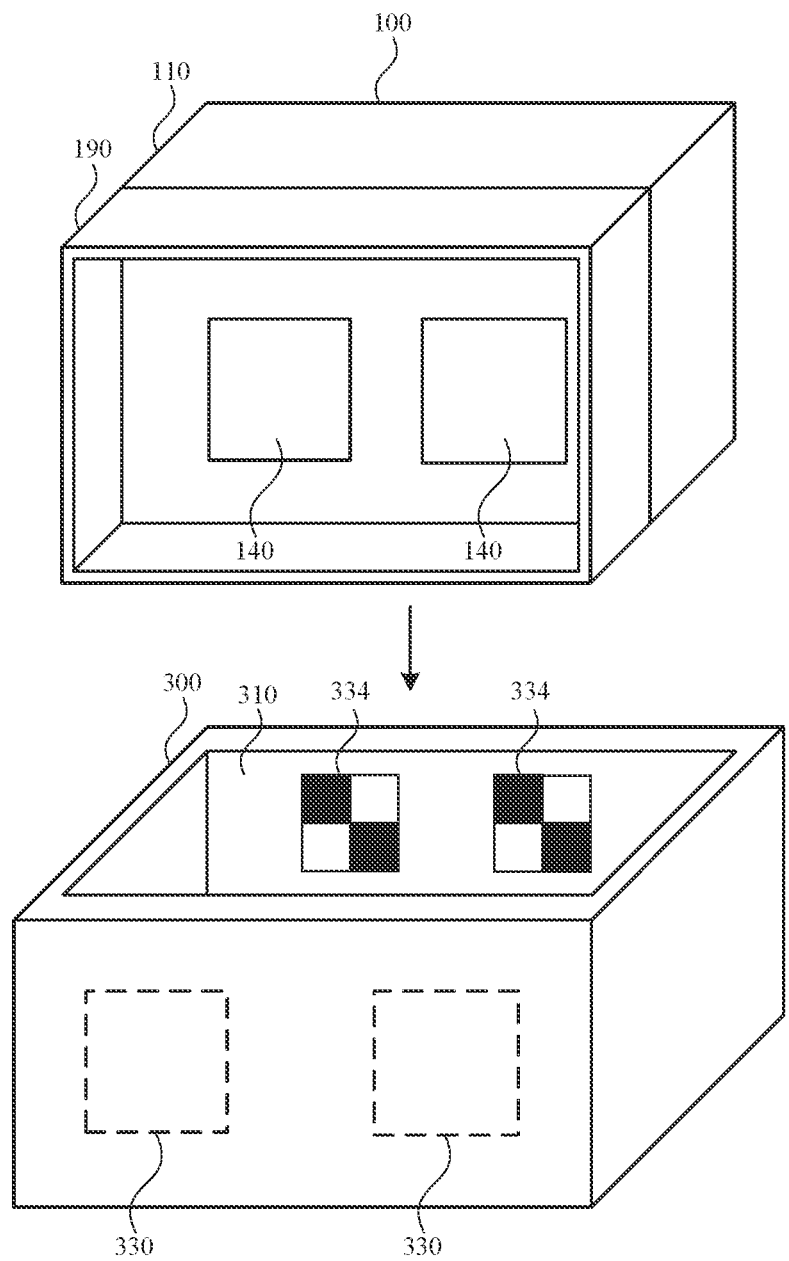
FIG. 3 illustrates a perspective view of a head-mountable device and case for receiving the head-mountable device, according to some embodiments of the present disclosure.

Referring now to FIG. 3, a case can be provided for receiving the head-mountable device and for providing one or more calibration features to allow the head-mountable device to operate more accurately.

As shown in FIG. 3, a case 300 can include a bay 310 for receiving at least a portion of the head-mountable device 100. For example, the head-mountable device 100 can be inserted into the bay 310 and secured therein at least temporarily. The case 300 can serve as a storage container for holding the head-mountable device 100 while not in use. The case 300 can further serve as a charging station for charging a battery of the head-mountable device 100.

The bay 310 can provide a size and/or shape that corresponds to a size and/or shape of at least a portion of the head-mountable device 100. As such, the head-mountable device 100 can be directed to a particular position and/or orientation within the bay 310. Additionally or alternatively, the head-mountable device 100 and/or the case 300 can include engagement elements (e.g., magnets, snaps, guides, rails, and the like) to urge and maintain the head-mountable device 100 in a particular position and/or orientation with respect to the case 300. For example, the housing 110 of the head mountable device 100 can be at least partially rigid such that it can be engaged by the case 300 in a known and predictable position and orientation with respect to the case 300 and its components.

The case 300 can provide one or more calibration patterns 330 that have a fixed and known position and/or orientation with respect to the head-mountable device 100 when the head-mountable device 100 (e.g., housing 110) is received within the bay 310. The calibration patterns 330 can be provided at a location that is within a field of view of one or more cameras (not shown) of the head-mountable device 100 when the head-mountable device 100 (e.g., housing 110) is received within the bay 310. The images of the calibration patterns 330 captured by the cameras of the head-mountable device 100 can be used to determine a calibration factor used to remedy the shift of the cameras over time, as described further herein.

The case 300 can provide one or more cameras 330 that have a fixed and known position and/or orientation with respect to the head-mountable device 100 when the head-mountable device 100 (e.g., housing 110) is received within the bay 310. The display elements 140 of the head-mountable device 100 can be provided at a location that is within a field of view of one or more cameras 330 of the case 300 when the head-mountable device 100 (e.g., housing 110) is received within the bay 310. Additionally or alternatively, one or more lenses (not shown) of the head-mountable device 100 can be provided at a location that is within a field of view of one or more cameras 330 of the case 300 when the head-mountable device 100 (e.g., housing 110) is received within the bay 310. The display elements 140 can be operated to present calibration patterns that are captured by the cameras 330 of the case 300. The images captured by the cameras 330 can be used to determine a calibration factor used to remedy the shift of the display elements 140 and/or lenses over time, as described further herein.

Figure 4:
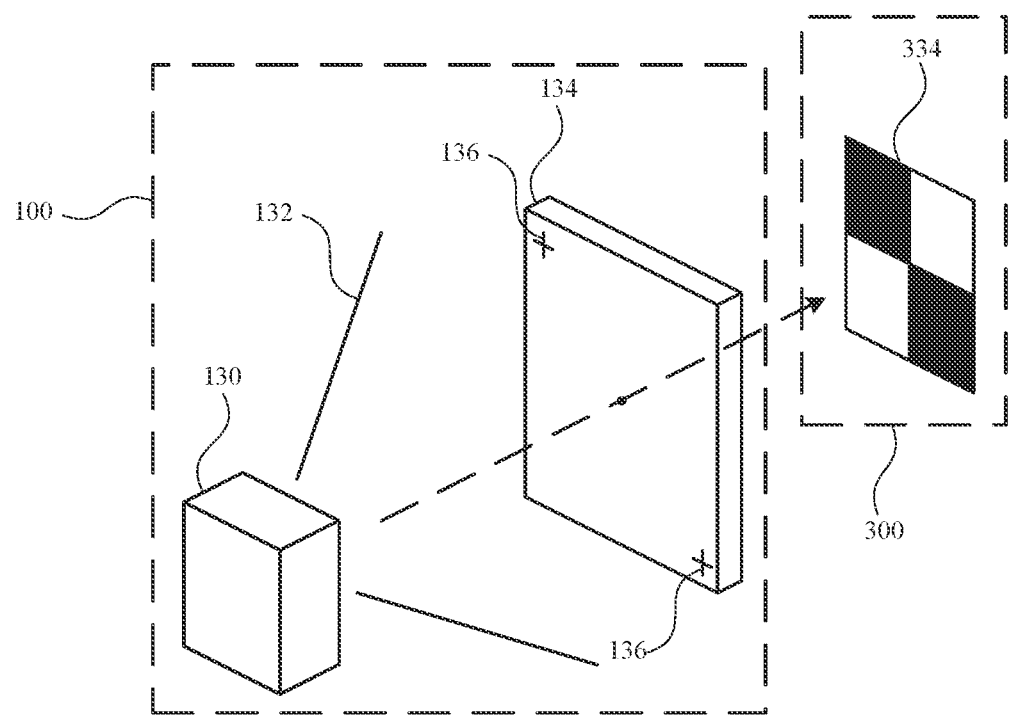
FIG. 4 illustrates a perspective view of a camera and a window of a head-mountable device and a calibration pattern of a case, according to some embodiments of the present disclosure.
Figure 5:
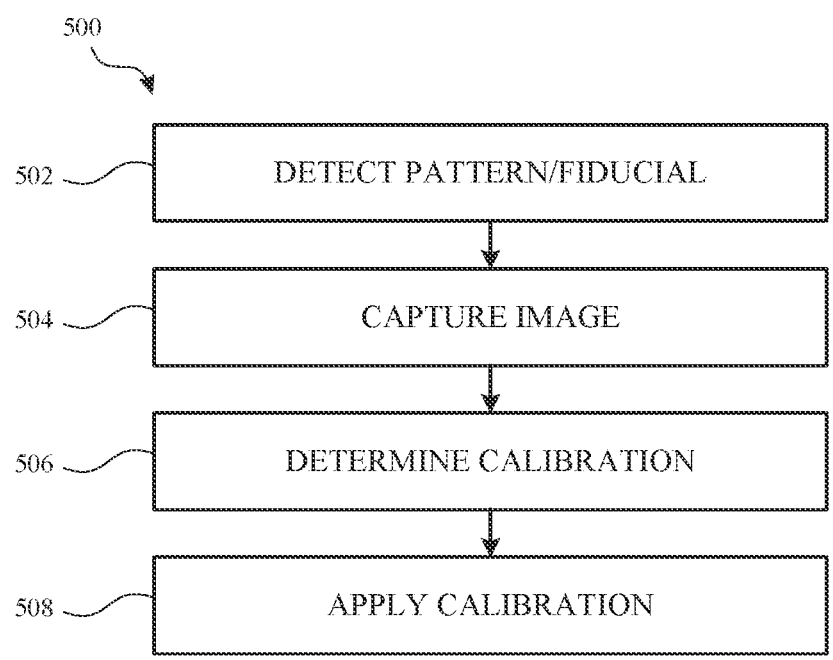
FIG. 5 illustrates a flow chart for a process of calibrating a head-mountable device, according to some embodiments of the present disclosure.

Referring now to FIGS. 4 and 5, a head-mountable device and case can be operated in concert to calibrate a position and/or orientation of a camera and/or images captured by the camera.

As shown in FIG. 4, the head-mountable device 100 can include one or more cameras 130 that are operable to detect the position and/or orientation of a calibration pattern 334 of a case 300. Based on such operations, a calibration factor can be determined to improve performance of components that rely on operation of the camera 130.

For example, a camera 130 can be positioned and oriented so that it has a field of view 132 that includes the calibration pattern 334 of the case 300 when the head-mountable device 100 is engaged to the case 300. The camera 130 can be operated to optically detect the position and/or orientation of the calibration pattern 334 within an image captured by the camera 130.

A detection can be facilitated by capturing a view of the calibration pattern 334. The calibration pattern 334 can be optically or otherwise distinguishable from other structures within the field of view 132. The calibration pattern 334 can be or have known visual features. The image of the calibration pattern 334 as captured by the camera 130 can be compared to the known visual feature represented by the calibration pattern 334. For example, a target position and orientation of the camera 130 can be one at which the camera captures an image of the calibration pattern 334 that matches the known visual features of the calibration pattern 334. Any difference between the actual image and the known visual features of the calibration pattern 334 can indicate a misalignment of the camera 130. Accordingly, corrective adjustments can be made based on the actual image and the known visual features.

While the calibration pattern 334 is provided on a surface of the case 300 (e.g., within the bay 310), it will be understood that the calibration pattern 334 can be on any surface that is within the field of view of the camera 130. For example, the calibration pattern 334 can be on a display of another device and/or a physical pattern (e.g., printout). The calibration pattern 334 can have a known position and/or orientation with respect to the head-mountable device 100 to facilitate image capture and calibration.

Optionally, the camera 130 can be positioned and oriented so that it has a field of view 132 that includes the window 134 of the head-mountable device 100. The camera 130 can be operated to optically detect the position and/or orientation of the window 134 within an image captured by the camera 130. The window 134 can include one or more fiducial markers 136 to provide visual references of the position and/or orientation of the window 134 with respect to the camera 130.

A detection can be facilitated by capturing a view of the fiducial markers 136. The fiducial markers 136 can be optically or otherwise distinguishable from other structures within the field of view 132. The fiducial markers 136 can be or have known visual features. The image of the fiducial markers 136 as captured by the camera 130 can be compared to the known visual feature represented by the fiducial markers 136. For example, a target position and orientation of the camera 130 can be one at which the camera 130 can capture an image of the fiducial markers 136 that matches the known visual features of the fiducial markers 136. Any difference between the actual image and the known visual features of the fiducial markers 136 can indicate a misalignment of the camera 130. Accordingly, corrective adjustments can be made based on the actual image and the known visual features.

Detections and calibrations can be based on the calibration pattern 334 and/or the fiducial markers 136. Either can be captured to perform calibration steps. Additionally or alternatively, both can be captured for calibration based on both. For example, the view of the calibration pattern 334 and the fiducial markers 136 can provide redundant reference points for performing calibration steps.

FIG. 5 illustrates a flow diagram of an example process 500 for determining an appropriate calibration for a head-mountable device. For explanatory purposes, the process 500 is primarily described herein with reference to the head-mountable device 100 and case 300 of FIGS. 1-4. However, the process 500 is not limited to the head-mountable device 100 and case 300 of FIGS. 1-4, and one or more blocks (or operations) of the process 500 may be performed by different components of the head-mountable device, the case, and/or one or more other devices. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The process 500 can begin when the head-mountable device detects a calibration pattern of a case and/or a fiducial marker of a window (502). Such a detection can be made by one or more sensors of the head-mountable device and/or when the head-mountable device is received by the case.

A camera of the head-mountable device can capture an image of the calibration pattern and/or the fiducial markers (504). The image of the calibration pattern of the case can optionally be of a view through the window. The same image can contain the calibration pattern and the fiducial markers. Alternatively, separate images can be captured for each of the calibration pattern and the fiducial markers.

Based on the captured image, a calibration factor can be determined (506). For example, the known visual features of the calibration pattern and/or the fiducial markers can be compared to the actual image of the calibration pattern and/or the fiducial markers. Based on the comparison, the head-mountable device can determine a calibration factor that, when applied to images captured by the camera, would cause the captured image of the calibration pattern and/or the fiducial markers to be identical to the corresponding known visual features. Such an adjustment can be performed by a processor and applied to future images captured by the camera prior to display thereof (e.g., by a display element). Such adjustments based on the calibration factor can include translation, rotation, stretching, bending, or other manipulations of the images. As such, following calibration, the captured images (e.g., while the head-mountable device is worn by a user) are modified so that the display elements present a calibrated image.

Additionally or alternatively, based on the comparison, one or more actuators and/or motors can be operated to adjust the position and/or orientation of the camera so that the captured image of the calibration pattern and/or the fiducial markers are identical to the corresponding known visual features.

Figure 6:
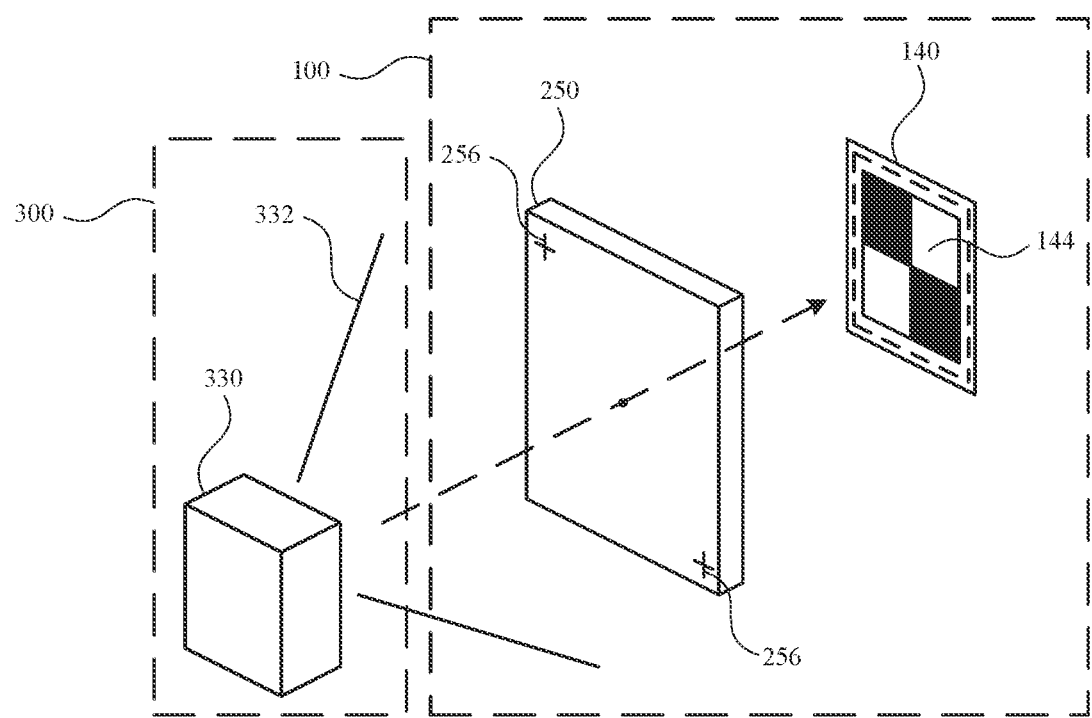
FIG. 6 illustrates a perspective view of a camera of a case and a lens and a display element of a head-mountable device, according to some embodiments of the present disclosure.
Figure 7:
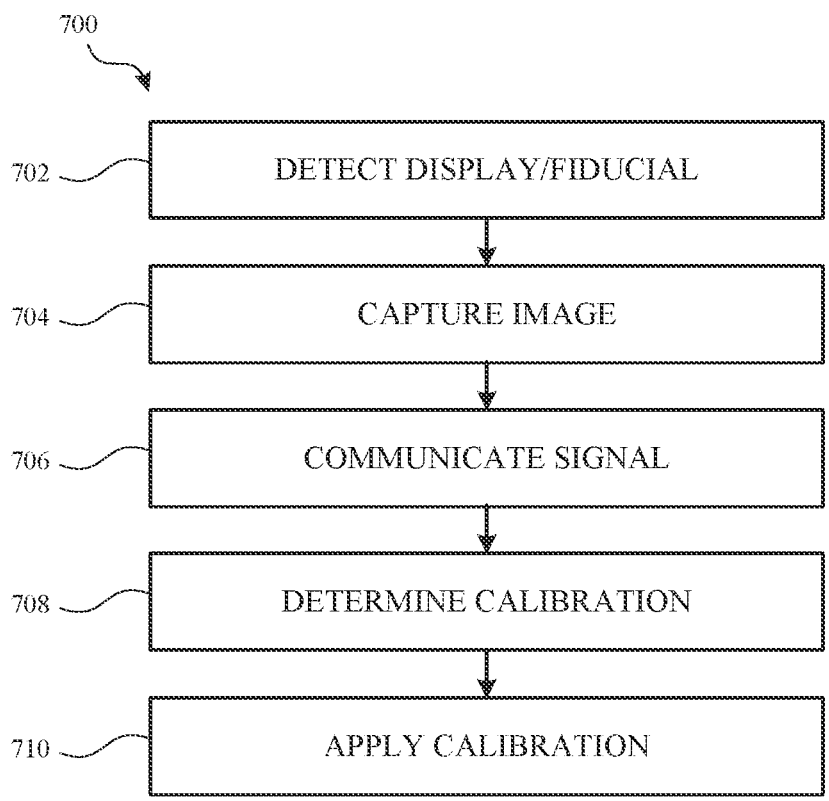
FIG. 7 illustrates a flow chart for a process having operations performed by a head-mountable device, according to some embodiments of the present disclosure.

Referring now to FIGS. 6 and 7, a head-mountable device and case can be operated in concert to calibrate a position and/or orientation of a display element and/or lens for images presented therewith.

As shown in FIG. 6, the case 300 can include one or more cameras 330 that are operable to detect the position and/or orientation of a calibration pattern 144 presented by a display element 140 of a head-mountable device 100. Based on such operations, a calibration factor can be determined to improve performance of the display element 140.

For example, a camera 330 can be positioned and oriented so that it has a field of view 332 that includes the calibration pattern 144 of the display element 140 when the head-mountable device 100 is engaged to the case 300. The camera 330 can be operated to optically detect the position and/or orientation of the calibration pattern 144 within an image captured by the camera 330.

Optionally, the camera 330 can be positioned and oriented so that it has a field of view 332 that includes the lens 250 of the head-mountable device 100. The camera 330 can be operated to optically detect the position and/or orientation of the lens 250 within an image captured by the camera 330. The lens 250 can include one or more fiducial markers 256 to provide visual references of the position and/or orientation of the lens 250 with respect to the camera 330.

A detection can be facilitated by capturing a view of the calibration pattern 144. The calibration pattern 144 can be optically or otherwise distinguishable from other structures within the field of view 332. The calibration pattern 144 can be or have known visual features. The image of the calibration pattern 144 as captured by the camera 330 can be compared to the known visual feature represented by the calibration pattern 144. For example, a target position and orientation of the display element 140 and/or the lens 250 can be one at which the camera 330 captures an image of the calibration pattern 144 that matches the known visual features of the calibration pattern 144. Any difference between the actual image and the known visual features of the calibration pattern 144 can indicate a misalignment of the display element 140 and/or the lens 250. Accordingly, corrective adjustments can be made based on the actual image and the known visual features.

Additionally or alternatively, a detection can be facilitated by capturing a view of the fiducial markers 256. The fiducial markers 256 can be optically or otherwise distinguishable from other structures within the field of view 332. The fiducial markers 256 can be or have known visual features. The image of the fiducial markers 256 as captured by the camera 330 can be compared to the known visual feature represented by the fiducial markers 256. For example, a target position and orientation of the lens 250 can be one at which the camera 330 can capture an image of the fiducial markers 256 that matches the known visual features of the fiducial markers 256. Any difference between the actual image and the known visual features of the fiducial markers 256 can indicate a misalignment of the lens 250. Accordingly, corrective adjustments can be made based on the actual image and the known visual features.

Detections and calibrations can be based on the calibration pattern 144 and/or the fiducial markers 256. Either can be captured to perform calibration steps. Additionally or alternatively, both can be captured for calibration based on both. For example, the view of the calibration pattern 144 and the fiducial markers 256 can provide redundant reference points for performing calibration steps.

FIG. 7 illustrates a flow diagram of an example process 700 for determining an appropriate calibration for a head-mountable device. For explanatory purposes, the process 700 is primarily described herein with reference to the head-mountable device 100 and case 300 of FIGS. 1-3 and 6. However, the process 700 is not limited to the head-mountable device 100 and case 300 of FIGS. 1-3 and 6, and one or more blocks (or operations) of the process 700 may be performed by different components of the head-mountable device, the case, and/or one or more other devices. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The process 700 can begin when the case detects a calibration pattern of a head-mountable device and/or a fiducial marker of a lens (702). Such a detection can be made by one or more sensors of the case when the head-mountable device is received by the case.

A camera of the case can capture an image of the calibration pattern and/or the fiducial markers (704). The image of the calibration pattern of the case can optionally be of a view through the lens. The same image can contain the calibration pattern and the fiducial markers. Alternatively, separate images can be captured for each of the calibration pattern and the fiducial markers.

Based on the captured image, a calibration factor can be determined (706). For example, the known visual features of the calibration pattern and/or the fiducial markers can be compared to the actual image of the calibration pattern and/or the fiducial markers. Based on the comparison, the head-mountable device can determine a calibration factor that, when applied to images for presentation by the display element, would cause the display element to present a calibration pattern that is identical to the corresponding known visual feature. Corresponding adjustments can be made based on the fiducial markers and known vision correction properties of the lenses. Such an adjustment can be performed by a processor and applied to future images presented by the display element. As such, following calibration, the images (e.g., captured by the camera of the head-mountable device) are modified so that the display element presents a calibrated image. Additionally or alternatively, based on the comparison, one or more actuators and/or motors can be operated to adjust the position and/or orientation of the display element and/or the lens so that the presented calibration pattern and/or the fiducial markers are identical to the corresponding known visual features.

The process 700 can be initiated based, at least in part, on one or more of a variety of conditions. For further example, the head-mountable device can determine that it is coupled to the case and can further determine that a detection and/or adjustment is to be performed under such a condition. By further example, detections can be performed periodically, continually, and/or combinations thereof. By further example, the head-mountable device can detect (e.g., by an accelerometer, gyroscope, etc.) an event (e.g., drop event, impact, shock, etc.) that may result in misalignment of the display element and determine that a detection of the display element and/or adjustment is to be performed. By further example, the head-mountable device can receive a command from a user (e.g., from a user input component) to perform a detection and/or adjustment. By further example, the head-mountable device can reference a predetermined schedule and/or period of time to determine that a detection and/or adjustment is to be performed.

Figure 8:
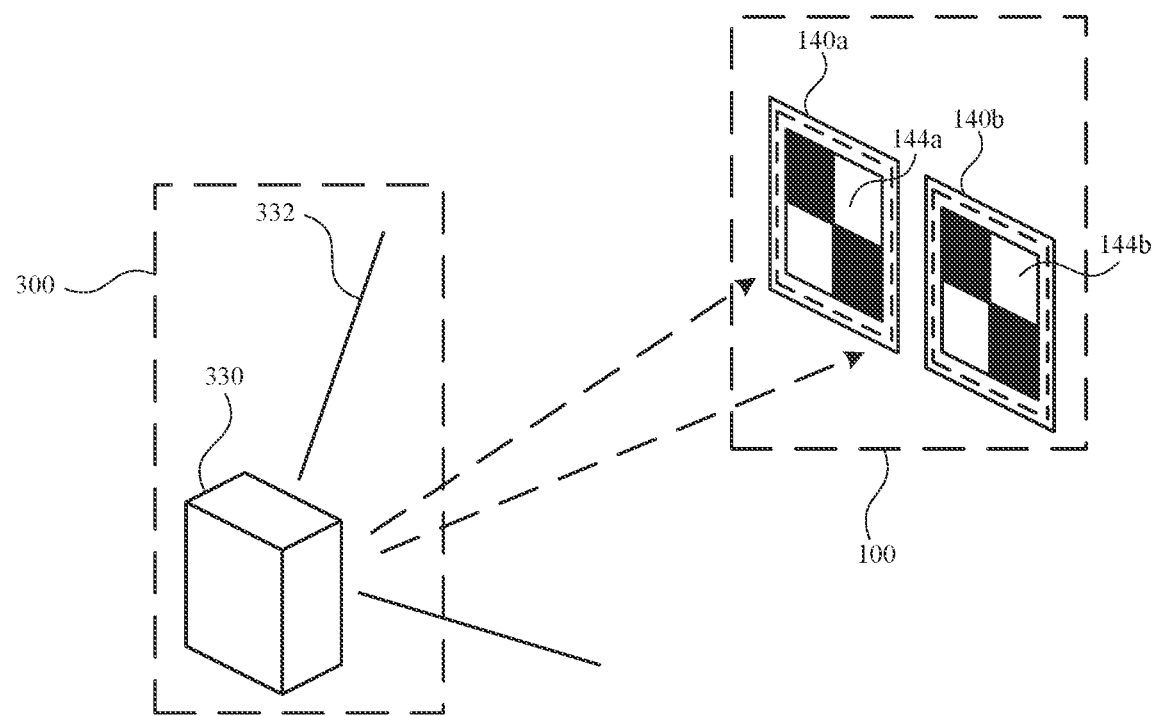
FIG. 8 illustrates a perspective view of a camera of a case and display elements of a head-mountable device, according to some embodiments of the present disclosure.
Figure 9:
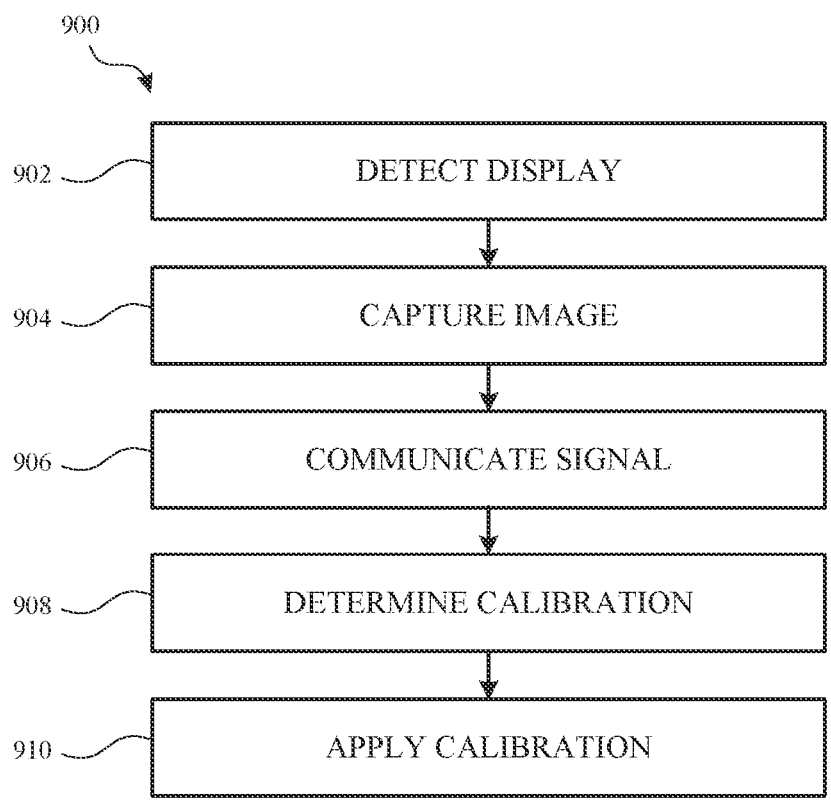
FIG. 9 illustrates a flow chart for a process having operations performed by a head-mountable device, according to some embodiments of the present disclosure.

Referring now to FIGS. 8 and 9, a head-mountable device and case can be operated in concert to calibrate a relative position and/or orientation of multiple display elements for images presented therewith.

Referring now to FIG. 8, the case 300 can include one or more cameras 330 that are operable to detect the relative position and/or orientation of calibration patterns 144a and 144b presented by multiple (e.g., first and second) display elements 140a and 140b of a head-mountable device 100. Based on such operations, a calibration factor can be determined to improve performance of the display elements 140a and 140b.

For example, a camera 330 can be positioned and oriented so that it has a field of view 332 that includes the calibration patterns 144a and 144b of the display elements 140a and 140b when the head-mountable device 100 is engaged to the case 300. Additionally or alternatively, multiple cameras can be operated. The camera 330 can be operated to optically detect the position and/or orientation of the calibration patterns 144*a* and 144*b* within an image captured by the camera 330.

A detection can be facilitated by capturing a view of the calibration patterns 144*a* and 144*b*. The calibration patterns 144*a* and 144*b* can be optically or otherwise distinguishable from other structures within the field of view 332. The calibration patterns 144*a* and 144*b* can be or have known visual features, which can be identical to each other or different than each other. The image of the calibration patterns 144*a* and 144*b* as captured by the camera 330 can be compared to the known visual features represented by the calibration patterns 144*a* and 144*b*. For example, a target relative position and orientation of the display elements 140*a* and 140*b* can be one at which the camera 330 captures an image of the calibration patterns 144*a* and 144*b* that matches the known visual features of the calibration patterns 144*a* and 144*b*. Any difference between the actual image and the known visual features of the calibration patterns 144*a* and 144*b* can indicate a misalignment of the display elements 140 (e.g., relative to each other). Accordingly, corrective adjustments can be made based on the actual image and the known visual features.

FIG. 9 illustrates a flow diagram of an example process 900 for determining an appropriate calibration for a head-mountable device. For explanatory purposes, the process 900 is primarily described herein with reference to the head-mountable device 100 and case 300 of FIGS. 1-3 and 8. However, the process 900 is not limited to the head-mountable device 100 and case 300 of FIGS. 1-3 and 8, and one or more blocks (or operations) of the process 900 may be performed by different components of the head-mountable device, the case, and/or one or more other devices. Further for explanatory purposes, the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

The process 900 can begin when the case detects a calibration pattern of a head-mountable device and/or a fiducial marker of a lens (902). Such a detection can be made by one or more sensors of the case when the head-mountable device is received by the case.

A camera of the case can capture an image of the calibration patterns (904). The image of the calibration patterns of the case can optionally be of a view through the lens. The same image can contain the calibration patterns. Alternatively, separate images can be captured for each of the calibration patterns.

Based on the captured image, a calibration factor can be determined (906). For example, the known visual features of the calibration patterns can be compared to the actual image of the calibration patterns. Based on the comparison, the head-mountable device can determine a calibration factor that, when applied to images for presentation by the display elements, would cause the display elements to present calibration patterns that are identical to the corresponding known visual feature. Such an adjustment can be performed by a processor and applied to future images presented by the display elements. As such, following calibration, the images (e.g., captured by the camera of the head-mountable device) are modified so that the display elements present calibrated images. Additionally or alternatively, based on the comparison, one or more actuators and/or motors can be operated to adjust the relative position and/or orientation of the display elements so that the presented calibration patterns are identical to the corresponding known visual features.

The processes described herein can be initiated based, at least in part, on one or more of a variety of conditions. For further example, the head-mountable device can determine that it is coupled to the case and can further determine that a detection and/or adjustment is to be performed under such a condition. By further example, detections can be performed periodically, continually, and/or combinations thereof. By further example, the head-mountable device can detect (e.g., by an accelerometer, gyroscope, etc.) an event (e.g., drop event, impact, shock, etc.) that may result in relative misalignment of the camera and/or display elements and determine that a detection of the camera and/or display elements and/or adjustment is to be performed. By further example, the head-mountable device can receive a command from a user (e.g., from a user input component) to perform a detection and/or adjustment. By further example, the head-mountable device can reference a predetermined schedule and/or period of time to determine that a detection and/or adjustment is to be performed.

Figure 10:
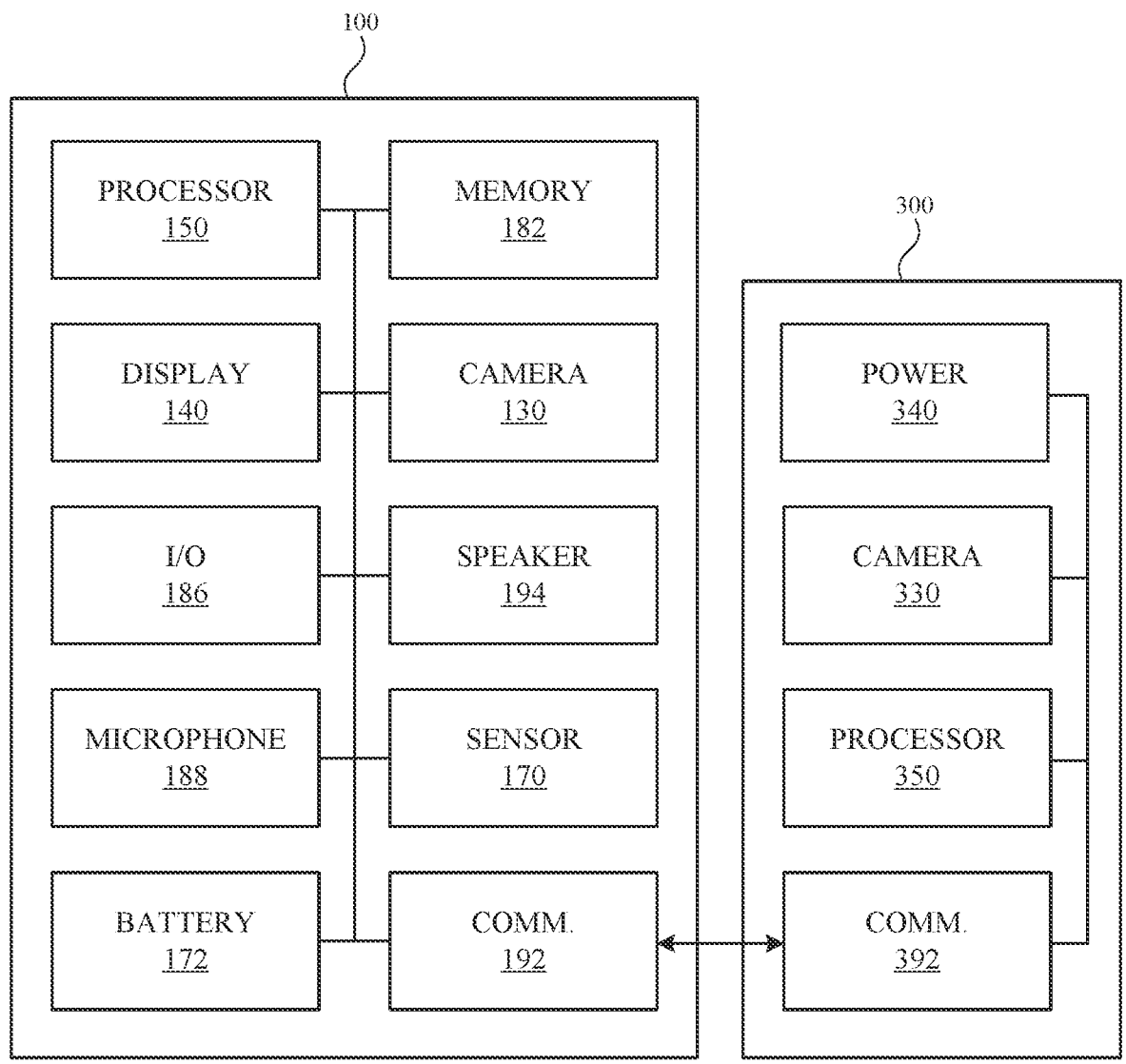
FIG. 10 illustrates a block diagram of a head-mountable device, in accordance with some embodiments of the present disclosure.

Referring now to FIG. 10, components of the head-mountable device can be operably connected to provide the performance described herein. FIG. 10 shows a simplified block diagram of an illustrative head-mountable device 100 in accordance with one embodiment of the invention. It will be appreciated that components described herein can be provided on one, some, or all of an HMD module, a light seal module, and/or a securement element. It will be understood that additional components, different components, or fewer components than those illustrated may be utilized within the scope of the subject disclosure.

As shown in FIG. 10, the head-mountable device 100 can include a processor 150 (e.g., control circuitry) with one or more processing units that include or are configured to access a memory 182 having instructions stored thereon. The instructions or computer programs may be configured to perform one or more of the operations or functions described with respect to the head-mountable device 100. The processor 150 can be implemented as any electronic device capable of processing, receiving, or transmitting data or instructions. For example, the processor 150 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 182 can store electronic data that can be used by the head-mountable device 100. For example, the memory 182 can store electrical data or content such as, for example, audio and video files, documents and applications, device settings and user preferences, timing and control signals or data for the various modules, data structures or databases, and so on. The memory 182 can be configured as any type of memory. By way of example only, the memory 182 can be implemented as random access memory, read-only memory, Flash memory, removable memory, or other types of storage elements, or combinations of such devices.

The head-mountable device 100 can further include a display element 140 for displaying visual information for a user. The display element 140 can provide visual (e.g., image or video) output. The display element 140 can be or include an opaque, transparent, and/or translucent display. The display element 140 may have a transparent or translucent medium through which light representative of images is directed to a user's eyes. The display element 140 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 100 can include an optical subassembly configured to help optically adjust and correctly project the image-based content being displayed by the display element 140 for close up viewing. The optical subassembly can include one or more lenses, mirrors, or other optical devices.

The head-mountable device 100 can further include a camera 130 for capturing a view of an external environment, as described herein. The view captured by the camera can be presented by the display element 140 or otherwise analyzed to provide a basis for an output on the display element 140.

The head-mountable device 100 can include an input/output component 186, which can include any suitable component for connecting head-mountable device 100 to other devices. Suitable components can include, for example, audio/video jacks, data connectors, or any additional or alternative input/output components. The input/output component 186 can include buttons, keys, or another feature that can act as a keyboard for operation by the user.

The head-mountable device 100 can include the microphone 188 as described herein. The microphone 188 can be operably connected to the processor 150 for detection of sound levels and communication of detections for further processing, as described further herein.

The head-mountable device 100 can include the speakers 194 as described herein. The speakers 194 can be operably connected to the processor 150 for control of speaker output, including sound levels, as described further herein.

The head-mountable device 100 can include one or more sensors 170 that are operable to measure characteristics of the user and/or the head-mountable device 100, as described herein. The head-mountable device 100 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc. Sensors can include the camera 130 which can capture image based content of the outside world.

The head-mountable device 100 can include a battery 172, which can charge and/or power components of the head-mountable device 100. The battery can receive power from external devices connected to the head-mountable device 100, such as the case 300.

The head-mountable device 100 can include communications circuitry 192 for communicating with one or more servers or other devices, such as the case 300, using any suitable communications protocol. For example, communications circuitry 192 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 192 can also include an antenna for transmitting and receiving electromagnetic signals.

The case 300 can be operated to provide power from a power source 340 to the head-mountable device 100 (e.g., to charge the battery 172).

The case 300 can include a camera 330, as described herein.

The case 300 can include a processor 350 (e.g., control circuitry) with one or more processing units that include or are configured to access a memory having instructions stored thereon. The instructions or computer programs may be configured to perform one or more of the operations or functions described with respect to the case 300. The processor 350 can be implemented as any electronic device capable of processing, receiving, or transmitting data or instructions. For example, the processor 350 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The case 300 can include communications circuitry 392 for communicating with one or more servers or other devices, such as the head-mountable device 100, using any suitable communications protocol. For example, communications circuitry 392 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 392 can also include an antenna for transmitting and receiving electromagnetic signals.

Accordingly, embodiments of the present disclosure provide a head-mountable device with display elements and/or cameras that can be calibrated for accurate recording and visual output. Whereas some aspects of a head-mountable device can be calibrated at the time of production, usage and wear of the head-mountable device can result in certain components becoming misaligned. A case or other reference can be used to calibrate the cameras of the head-mountable device to ensure that the captured images are recorded in a target alignment. The case can be operated with the head-mountable device to calibrate the display elements of the head-mountable device to ensure that the images are output in a target alignment. Such calibration can include consideration of any lenses installed in front of the display elements.

Various examples of aspects of the disclosure are described below as clauses for convenience. These are provided as examples, and do not limit the subject technology.

Clause A: a system comprising: a case comprising: a bay; and a calibration pattern within the bay; a head-mountable device comprising: a housing configured to engage the case when the head-mountable device is inserted into the bay; a camera configured to capture first image of the calibration pattern when the head-mountable device is inserted into the bay; a processor configured to, based on the calibration pattern in the first image, determine a calibration factor; and a display element configured to present a second image based at least in part on the calibration factor.

Clause B: a head-mountable device comprising: a housing; a camera supported by the housing; a display element supported by the housing; and a processor configured to: with the camera, capture a first image of a first view, the first view including a calibration pattern; based on the calibration pattern in the first image, determine a calibration factor; with the camera, capture a second image of a second view; apply the calibration factor to the second image to generate a third image; and with the display element, present the third image.

Clause C: a system comprising: a head-mountable device comprising: a housing; and a display element supported by the housing; and a case comprising: a bay configured to receive the head-mountable device; and a camera configured to capture a first image of the display element while the display element presents a calibration pattern; and a communication element configured to transmit to the head-mountable device a signal based on the calibration pattern in the first image; wherein the display element of the head-mountable device is configured to present a second image based at least in part on a calibration factor that is determined based on the calibration pattern in the first image.

One or more of the above clauses can include one or more of the features described below. It is noted that any of the following clauses may be combined in any combination with each other, and placed into a respective independent clause, e.g., clause A, B, or C.

Clause 1: the head-mountable device further comprises a battery; and the case further comprises a power source configured to recharge the battery of the head-mountable device.

Clause 2: the head-mountable device further comprises a window; and the first image is of a view of the calibration pattern through the window.

Clause 3: the window comprises a fiducial marker; the first image includes a view of the fiducial marker; the calibration factor is determined based on the calibration pattern and the fiducial marker in the first image.

Clause 4: the head-mountable device further comprises a motor configured to move the camera based on the calibration factor.

Clause 5: a head securement element configured to engage a head of a user; a microphone; a speaker; and communications circuitry for communicating with another device.

Clause 6: the head-mountable device further comprises a lens; and the first image is of a view of the display element through the lens.

Clause 7: the lens comprises a fiducial marker; the first image includes a view of the fiducial marker: the calibration factor is determined based on the calibration pattern and the fiducial marker in the first image.

Clause 8: the head-mountable device further comprises: a processor configured to, based on the first image, determine whether a portion of the calibration pattern is obstructed by an artifact on the lens; user interface configured to provide a notification to a user if the portion of the calibration pattern is obstructed by the artifact on the lens.

Clause 9: the display element is a first display element; the calibration pattern is a first calibration pattern; the head-mountable device further comprises a second display element; the first image is of: the first display element while the first display element presents the first calibration pattern; and the second display element while the second display element presents a second calibration pattern; the second display element is configured to present a third image based at least in part on the calibration factor.

Clause 10: the calibration factor is determined based on a relative position and a relative orientation of the first calibration pattern and the second calibration pattern in the first image.

Clause 11: the head-mountable device further comprises a battery; and the case further comprises a power source configured to recharge the battery of the head-mountable device.

Clause 12: the head-mountable device further comprises a motor configured to move the display element based on the calibration factor.

Clause 13: the head-mountable device further comprises a processor configured to, based on the signal, determine the calibration factor.

Clause 14: the case further comprises a processor configured to, based on the calibration pattern in the first image, determine the calibration factor; and the signal indicates the calibration factor.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary housing of reference, rather than to the ordinary gravitational housing of reference. Thus, such a term may extend upwardly, downwardly, diagonally, or horizontally in a gravitational housing of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A case for receiving a head-mountable device comprising a display element, the case comprising:
    a camera configured to capture a first image of a fiducial marker of the head-mountable device and of the display element while the display element presents a calibration pattern;
    a processor configured to, based on the fiducial marker and the calibration pattern in the first image, determine a calibration factor; and
    a communication element configured to transmit to the head-mountable device a signal indicating the calibration factor and comprising an instruction for the head-mountable device to operate the display element to present a second image based at least in part on the calibration factor.

2. The case of claim 1, further comprising a power source configured to recharge a battery of the head-mountable device.

3. The case of claim 1, wherein the signal further comprises an additional instruction for the head-mountable device to operate a motor to move the display element based on the calibration factor.

4. The case of claim 1, wherein the processor is configured to determine the calibration factor by comparing the calibration pattern in the first image to a known visual feature of the calibration pattern.

5. The case of claim 1, wherein the camera is a first camera, the display element is a first display element, the calibration pattern is a first calibration pattern, and the case further comprises a second camera configured to capture an additional image of a second display element of the head-mountable device while the second display element presents a second calibration pattern.

6. A case for receiving a head-mountable device comprising a display element and a lens comprising a fiducial marker, the case comprising:
    a camera configured to capture a first image of the display element through the lens while the display element presents a calibration pattern and of the fiducial marker; and
    a communication element configured to transmit to the head-mountable device a signal based on the calibration pattern in the first image, the signal comprising an instruction for the head-mountable device to operate the display element to present a second image based at least in part on a calibration factor that is determined based on the calibration pattern in the first image and the fiducial marker in the first image.

7. The case of claim 6, wherein the fiducial marker is one of multiple fiducial markers of the lens.

8. The case of claim 6, further comprising a power source configured to recharge a battery of the head-mountable device.

9. The case of claim 6, wherein the signal further comprises an additional instruction for the head-mountable device to operate a motor to move the display element based on the calibration factor.

10. The case of claim 6, further comprising a processor configured to, based on the calibration pattern in the first image, determine the calibration factor, wherein the signal indicates the calibration factor.

11. The case of claim 10, wherein the processor is configured to determine the calibration factor by comparing the calibration pattern in the first image to a known visual feature of the calibration pattern.

12. The case of claim 6, wherein the camera is a first camera, the display element is a first display element, the calibration pattern is a first calibration pattern, and the case further comprises a second camera configured to capture an additional image of a second display element of the head-mountable device while the second display element presents a second calibration pattern.

13. A case for receiving a head-mountable device comprising a first display element and a second display element, the case comprising:
    a first camera facing the head-mountable device when the head-mountable device is received within the case, the first camera being configured to capture a first image of the first display element while the first display element presents a first calibration pattern;
    a second camera facing the head-mountable device when the head-mountable device is received within the case, the second camera being configured to capture a second image of the second display element while the second display element presents a second calibration pattern; and
    a communication element configured to transmit to the head-mountable device a signal comprising an instruction for the head-mountable device to:
        operate the first display element to present a third image based at least in part on a calibration factor; and operate the second display element to present a fourth image based at least in part on the calibration factor, the calibration factor being determined based on the first calibration pattern in the first image and the second calibration pattern in the second image.

14. The case of claim 13, wherein the calibration factor is determined based on a relative position and a relative orientation of the first calibration pattern and the second calibration pattern in the first image.

15. The case of claim 13, further comprising a power source configured to recharge a battery of the head-mountable device.

16. The case of claim 13, wherein the signal further comprises an additional instruction for the head-mountable device to operate a motor to move the first display element and the second display element based on the calibration factor.

17. The case of claim 13, further comprising a processor configured to, based on the first calibration pattern and the second calibration pattern in the first image, determine the calibration factor, wherein the signal indicates the calibration factor.

18. The case of claim 17, wherein the processor is configured to determine the calibration factor by comparing the first calibration pattern and the second calibration pattern in the first image to known visual features of the first calibration pattern and the second calibration pattern.

\* \* \* \* \*